United States Patent
Nathan et al.

(10) Patent No.: US 11,595,309 B2
(45) Date of Patent: Feb. 28, 2023

(54) SOURCE NETWORK ADDRESS TRANSLATION FOR UNIQUE SENDER IDENTIFICATION

(71) Applicant: salesforce.com, inc., San Francisco, CA (US)

(72) Inventors: Rahul Nathan, Redmond, WA (US); Abhiram Gajjala, Dublin, CA (US); Arthur Jones, Bend, OR (US); Soumya Roy, San Ramon, CA (US); Kevin Wang, Cinncinnati, OH (US); Pallavi Rajan Udmalpet, San Francisco, CA (US); Shuai Wang, Bothell, WA (US)

(73) Assignee: Salesforce, Inc., San Francisco, CA (US)

(*) Notice: Subject to any disclaimer, the term of this patent is extended or adjusted under 35 U.S.C. 154(b) by 249 days.

(21) Appl. No.: 17/106,673

(22) Filed: Nov. 30, 2020

(65) Prior Publication Data

US 2022/0174014 A1    Jun. 2, 2022

(51) Int. Cl.
*H04L 45/00* (2022.01)
*H04L 47/12* (2022.01)

(52) U.S. Cl.
CPC ............. *H04L 47/12* (2013.01); *H04L 45/72* (2013.01)

(58) Field of Classification Search
CPC ......... H04L 45/72; H04L 47/12; H04L 45/00; H04L 45/34; H04L 45/36; H04L 45/74
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Chi H Pham
*Assistant Examiner* — Weibin Huang
(74) *Attorney, Agent, or Firm* — Dergosits & Noah LLP; Todd A. Noah

(57) ABSTRACT

Methods, systems and computer program products for tracking, encoding and decoding the code-location of runtime events. The system modifies a request packet to access a resource initiated by a source address to indicate the request packet was sent by an intermediary address. The system injects an identifier pre-allocated for the source address into the request packet. The system updates the modified request packet by replacing the intermediary address with a substitute address that corresponds with the source address' pre-allocated identifier. The system sends the updated request packet to the resource, the updated request packet indicating a response to the updated request packet is to be sent back to the substitute address.

20 Claims, 11 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 * | 10/2004 | Jones ................ H04M 3/4938 455/563 |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 * | 11/2009 | Larsson ................ G06Q 30/00 707/999.102 |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,892,414 B1 * | 2/2018 | Henry ................ G06Q 30/0617 |
| 10,397,189 B1 * | 8/2019 | Hashmi ................ H04L 63/0272 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0083013 A1 * | 6/2002 | Rollins ................ H04L 67/142 705/76 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 * | 8/2003 | George ................ G06F 16/252 707/E17.121 |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0156111 A1 * | 6/2015 | Tsiatsis ................ H04L 61/301 370/392 |
| 2015/0172563 A1 | 6/2015 | Jakobson et al. |
| 2016/0142365 A1 * | 5/2016 | Devarajan ................ H04L 45/74 370/392 |
| 2020/0228505 A1 * | 7/2020 | Lapidous ................ H04L 63/166 |

* cited by examiner

402 Transit VPC

502 Transit VPC Storage

504
Cust A Data
Pre-allocated Identifier A
Substitute I.P. address A
LB Source port identifier A 506
Cust B Data
Pre-allocated Identifier B
Substitute I.P. address B
LB Source port identifier B

SOURCE NETWORK ADDRESS TRANSLATION FOR UNIQUE SENDER IDENTIFICATION

TECHNICAL FIELD

The present disclosure relates generally to communications within one or more cloud computing environments.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional systems, many existing cloud infrastructures depend on an I.P. address of a source that sends out an API request(s) as a means for identifying the source to which a response(s) should be sent. However, when the source's request is encrypted and utilizes a private I.P. address, the intended destination that is in receipt of the source's API request will not be supplied with sufficient data with regard to the source of the request.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 5 is a high-level diagram of an environment according to one or more embodiments.

DETAILED DESCRIPTION

General Overview

Figure 1:
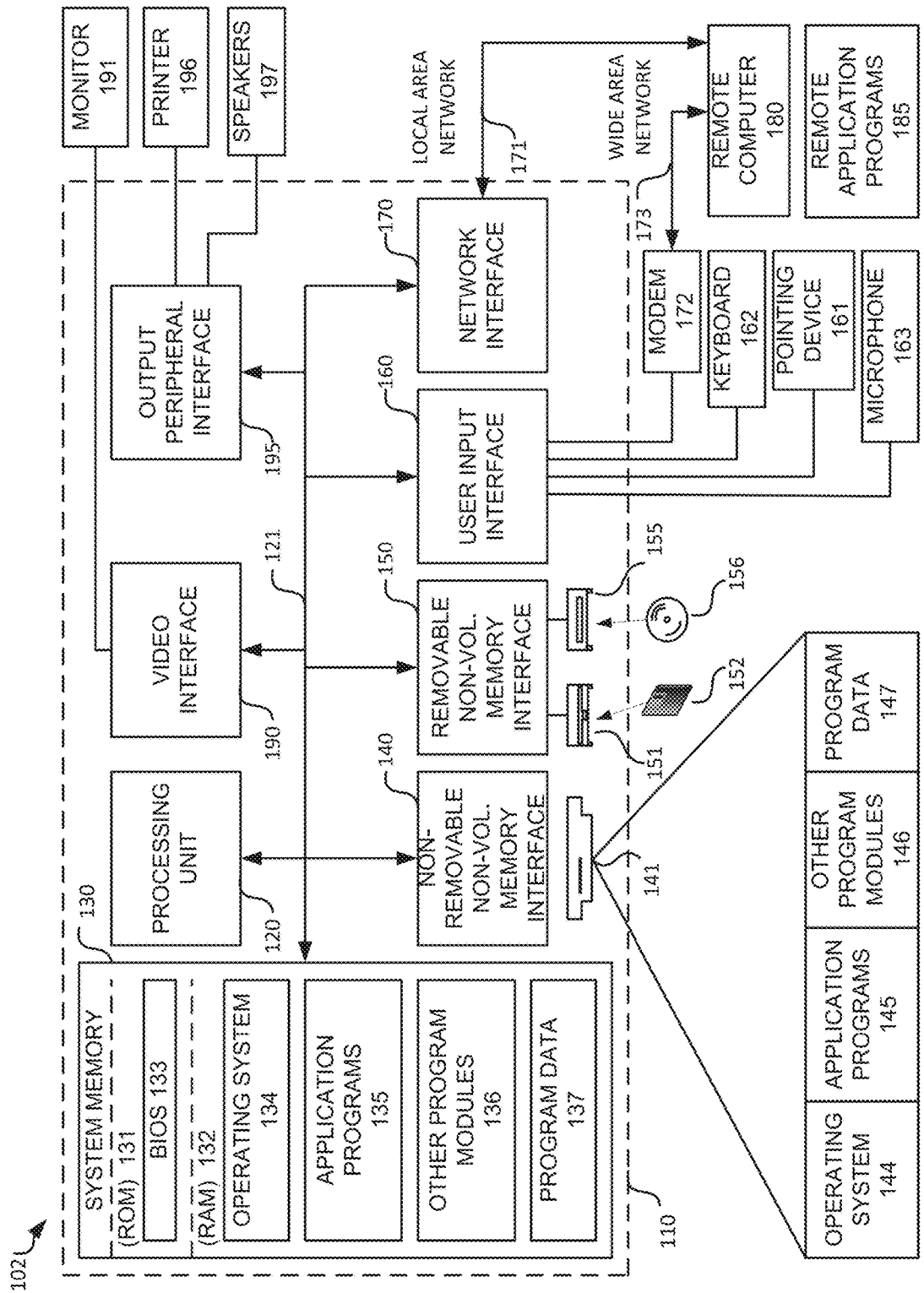
FIG. 1 shows a diagram of an example computing system that may be used with some embodiments.

In accordance with embodiments described herein, there are provided methods, systems and computer program products for an Address Manager. The Address Manager is directed towards providing a target destination(s) of requests with data upon which an intended recipient of a response sent from the target destination(s) can be discerned. According to one or more embodiments, the Address Manager may include a private link module ("private link"), a load balancer module ("load balancer") and a transit virtual private connection module ("transit VPC").

According to various embodiments, the Address Manager modifies a request packet to access a resource initiated by a source address to indicate the request packet was sent by an intermediary address. The Address Manager injects an identifier pre-allocated for the source address into the request packet. The Address Manager updates the modified request packet by replacing the intermediary address with a substitute address that corresponds with the source address' pre-allocated identifier. The Address Manager sends the updated request packet to the resource, whereby the updated request packet indicates a response to the updated request packet is to be sent back to the substitute address.

According to various embodiments, the intermediary address corresponds to the load balancer.

According to various embodiments, the transit VPC may be provided in a public cloud environment and a source I.P. address of a request packet intended for accessing a resource will be lost due to replacement of the source I.P. address with a load balancer I.P. address.

Various embodiments of the Address Manager may provide for replacing the load balancer I.P. address with a substitute I.P. address that has been pre-allocated for the source I.P. address such that the intended resource destination may respond back to the substitute I.P. address.

According to an embodiment, the transit VPC updates the modified request packet by replacing the intermediary address with the substitute address of the source I.P. address.

According to an embodiment, the transit VPC stores a pre-allocated identifier of the source I.P. address in relation to the source I.P. address' substitute address in persistent storage.

While one or more implementations and techniques are described herein as implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM® and the like, and other system software, without departing from the scope of the embodiments claimed.

In addition, according to various embodiments, it is understood that an "event" may associated with execution of computer software resulting in a state change Some examples of such events may be, as non-limiting examples, raising an error during processing, raising an exception indicating validity of user input, and acquisition of a type of system resource (e.g. memory allocation, buffer allocation, lock acquisition or release of previously-held locks, start of an I/O request).

Any of the embodiments described herein may be used alone or together with one another in any combination. The one or more implementations encompassed within this specification may also include embodiments that are only partially mentioned or alluded to or are not mentioned or alluded to at all in the abstract. Although various embodiments may have been motivated by various deficiencies with the prior art which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
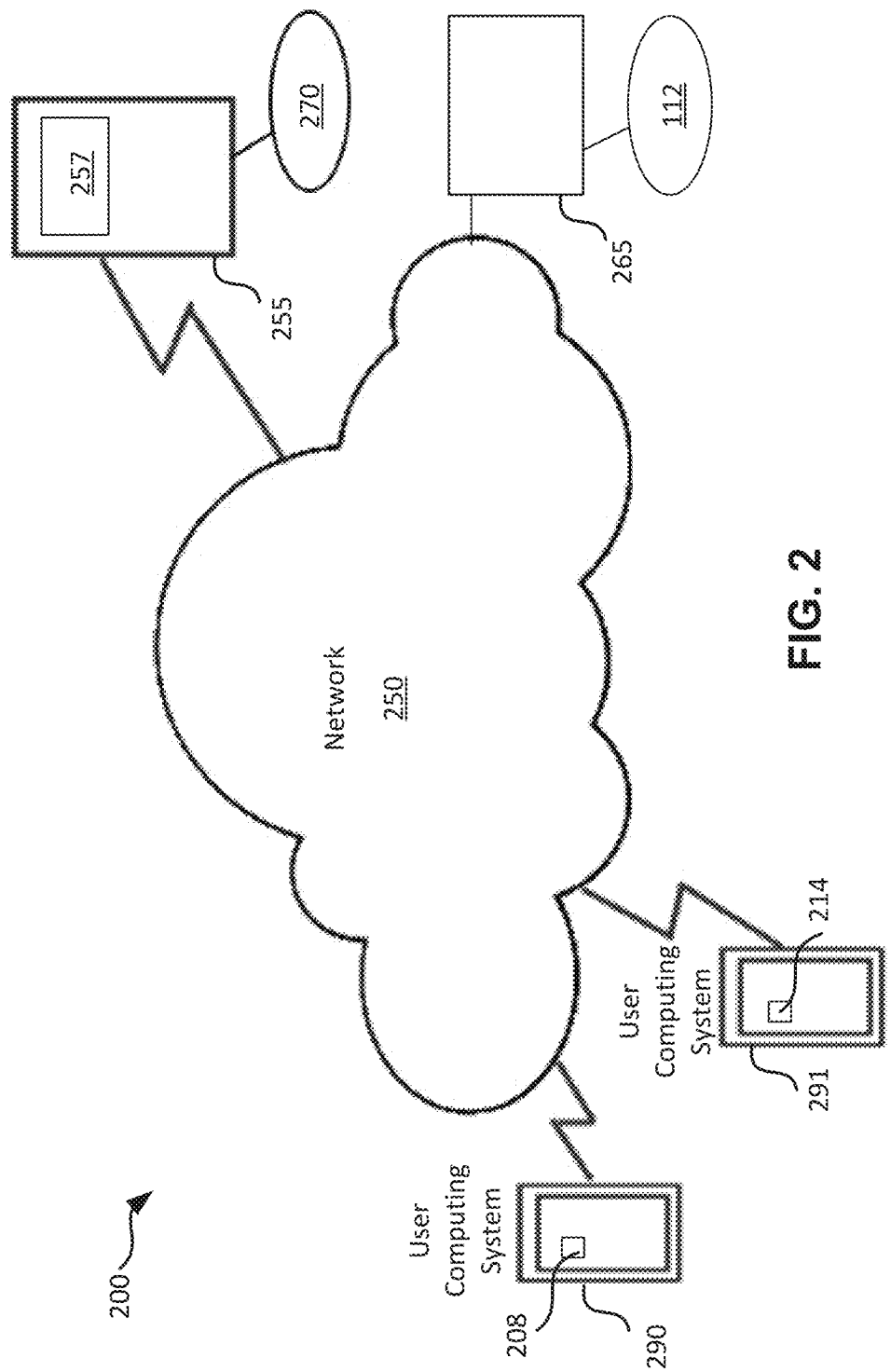
FIG. 2 shows a diagram of an example network environment that may be used with some embodiments.

FIG. 2 shows a diagram of an example network environment that may be used with some embodiments of the present invention. Network environment 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 and 265 via the network 250.

Each of the computing systems 290 and 291 may include an application module such as module 208 or 214. For example, a user (e.g., a developer) may use the computing system 290 and the application module 208 to connect to and communicate with the server computing system 255 and log into application 257 (e.g., a Salesforce.com® application).

For some embodiments, the user may use the application 257 to develop, manage, install and execute a software package(s) for pausing and resuming virtual environments and one or more of pre-processing and post-processing customized codes related to development, management, installation and execution of the software package(s). The pre-processing and post-processing customized codes may be executed by the server computing system 255. The development, management, installation and execution (or portions thereof) may be executed by the server computing system 265 associated with the server computing system 255. The server 265 may be associated with database 112. For example, the server computing system 265 may be configured to develop, manage, install and execute a software package(s) using a product of Salesforce.com.

Figure 3:
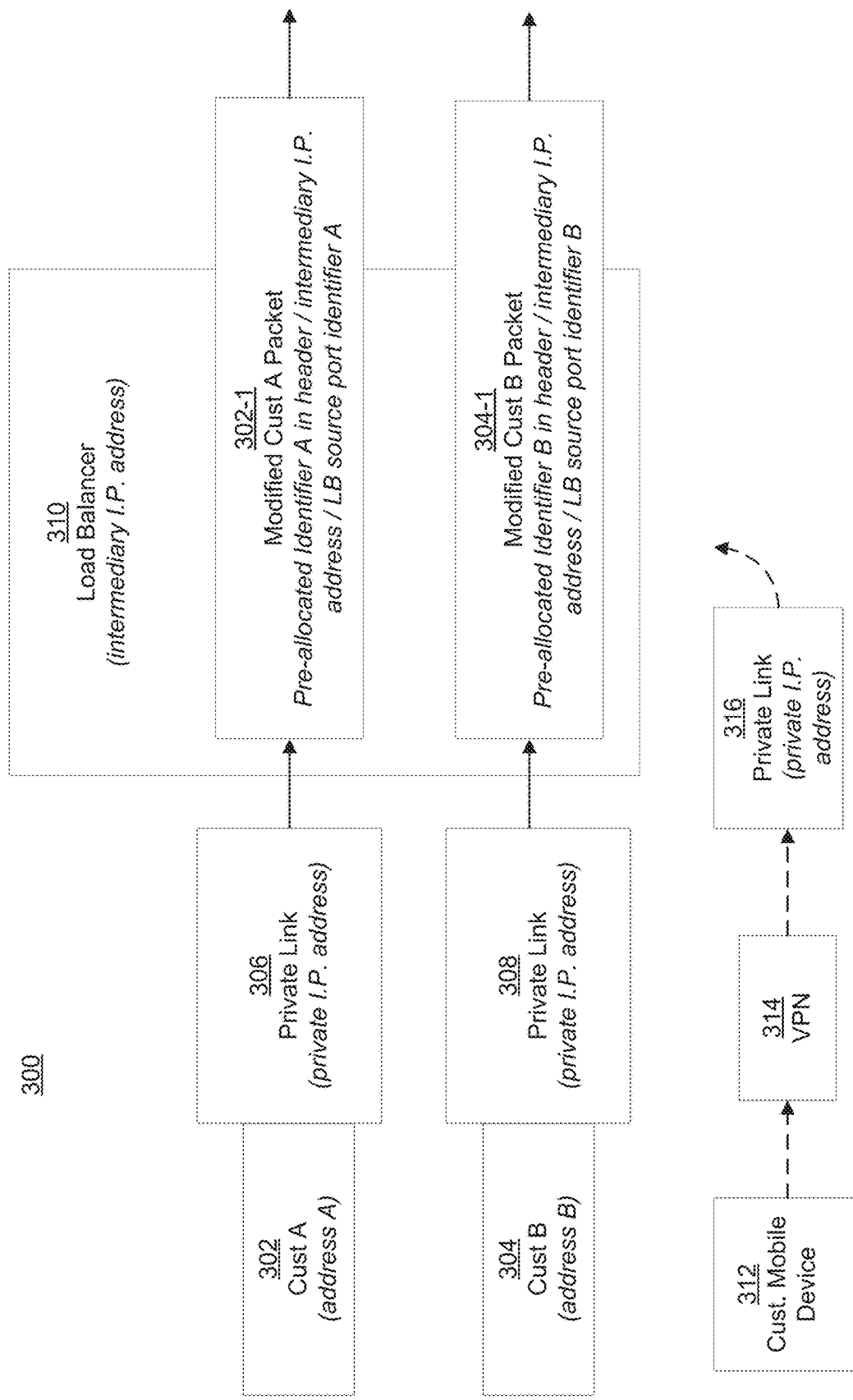
FIG. 3 is a high-level diagram of the Address Manager according to one or more embodiments.

FIG. 3 is a high-level diagram 300 of the Address Manager according to one or more embodiments. Each customer 302, 304 has its own unique originating address, such as, for example, a source I.P. address. Upon set up of a private link 306, 308 for both customers A and B 302, 304, the Address Manager generates pre-allocated unique identifiers and substitute I.P. address for each customer 302, 304. The private link 306, 308 allows the respective customer 302, 304 to connect to various cloud services via a private I.P. address in place of the customer's originating address. According to various embodiments, requests packets from different customers 302, 304 may indicate the same private I.P. address provided their respective private link 306, 308.

A load balancer module 310 associated with the Address Manager may receive the packet requests sent from the different customers 302, 304 that both indicate the private link's 306, 308 private I.P. address in place of a originating address. Each packet sent from a customer 302, 304 may be temporarily associated with a source port number. The load balancer module 310 detects the source port number include in an incoming packet request and identifies the corresponding originating address of the packet.

The load balancer module 310 injects the pre-allocated identifier for the originating address that corresponds to the source port number. For example, the load balancer module 310 injects the pre-allocated identifier into a portion of a proxy protocol header of the incoming packet request. For example, the header may be a Proxy Protocol V2 header. The incoming packet is further modified by the load balancer module 310 to include an intermediary I.P. address of the load balancer module 310. As such, when the load balancer module 310 receives incoming packet requests from the private link 306, 308 initiated by the customers 302, 304, the load balancer module 310 produces and relays modified packets 302-1, 304-1. A first modified packet 302-1 associated with the customer A 302 may include the load balancer intermediary I.P. address, the load balancer source port identifier for the modified packet and customer A's 302 pre-allocated identifier. A second modified packet 304-1 associated with the customer B 304 may include the load balancer intermediary I.P. address, the load balance source port identifier for the modified packet and customer B's 304 pre-allocated identifier. The load balancer module 301 sends the first and second modified packets 302-1, 304-1 to the transit VPC module 402 which will update the packets 302-1, 304-1 with substitutes addresses of customer A 302 and customer B 304.

According to various embodiments, a request packet may be sent from a customer mobile device 312. The mobile device 312 initiates a connection to a virtual private network 314 ("VPN"). One or more request packets sent from the mobile device 312 may be sent via the VPN 314 to a private link 316. Request packets from the mobile device are thereby processed from the private link 316 to the load balancer 310 in a similar manner as request packets sent from other customers 302, 304.

Figure 4A:
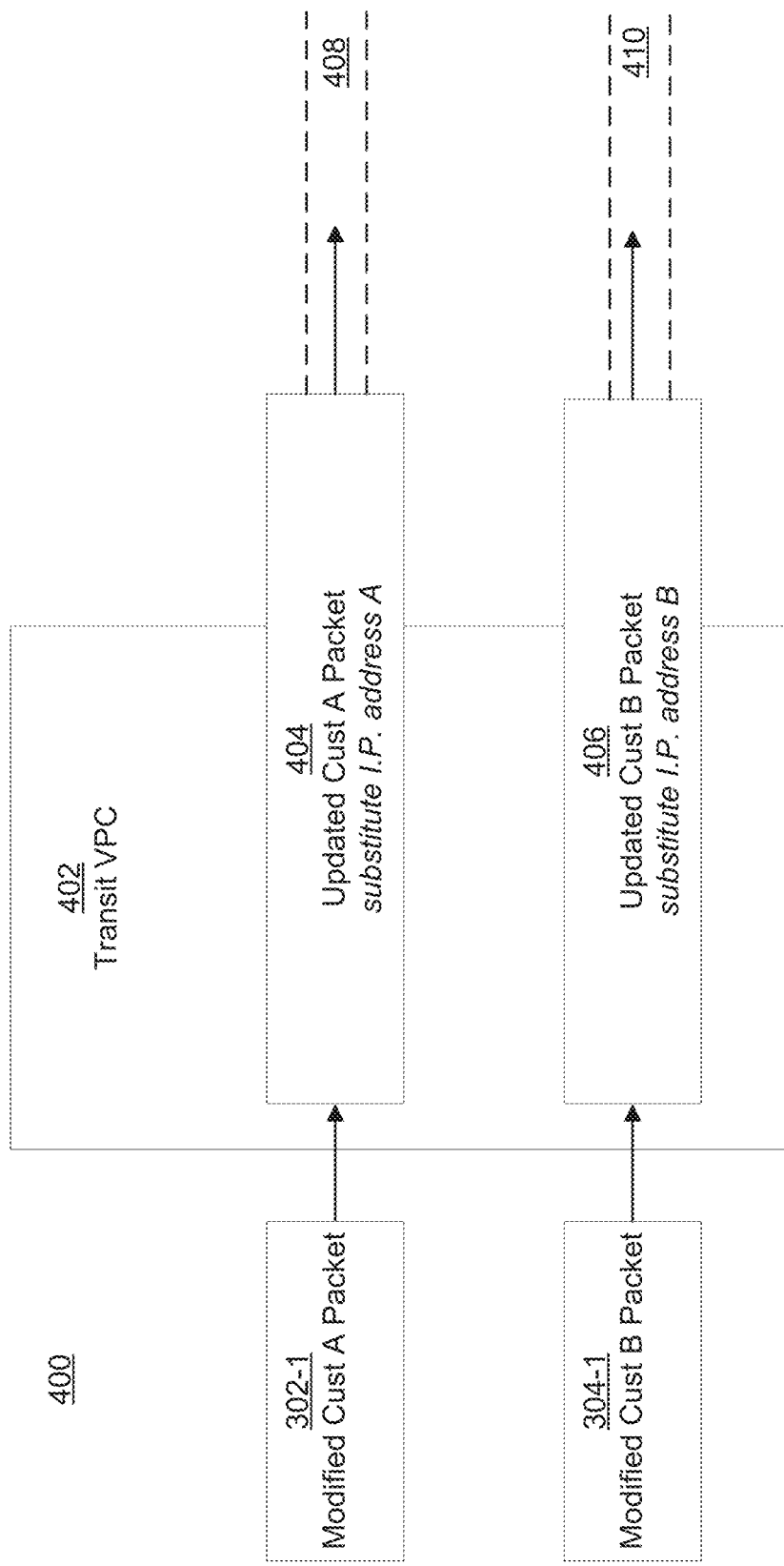
FIG. 4A is a high-level diagram of an environment according to one or more embodiments.

FIG. 4A is a high-level diagram 400 of the Address Manager according to one or more embodiments. A transit VPC module 402 of the Address Manager may receive the modified request packets 302-1, 304-1 relayed by the load balancer module 310. The transit VPC module 402 recognizes a respective pre-allocated identifier in each request packet's 302-1, 304-1 header that corresponds to a source I.P. address. The transit VPC module 402 replaces the load balancer's intermediary address in the modified request packets 302-1, 304-1 with a substitute I.P. address for the source I.P. address that corresponds to the pre-allocated identifier in the header. The transit VPC module 402 sends the updated request packets 404, 406 via encrypted tunnels 408, 410.

Figure 8:
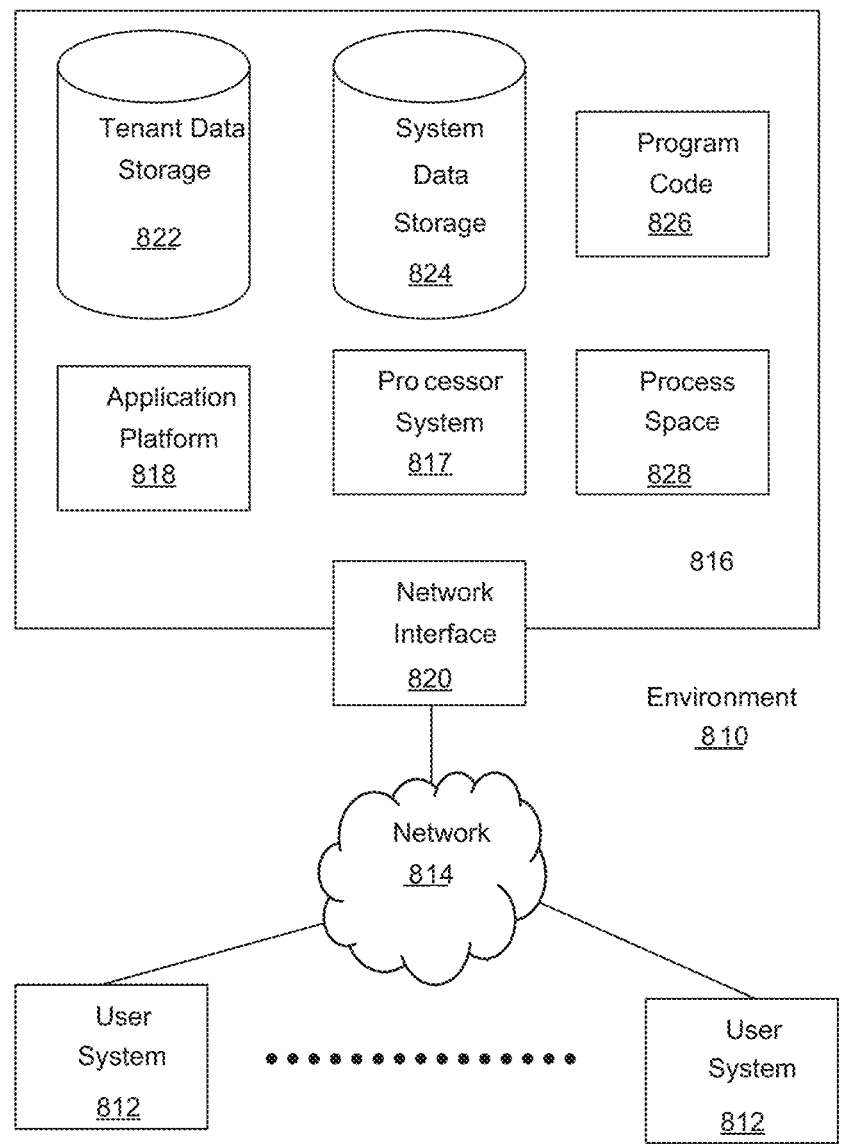
FIG. 8 is a high-level diagram of a user interface of the Address Manager, in an embodiment.
Figure 9:
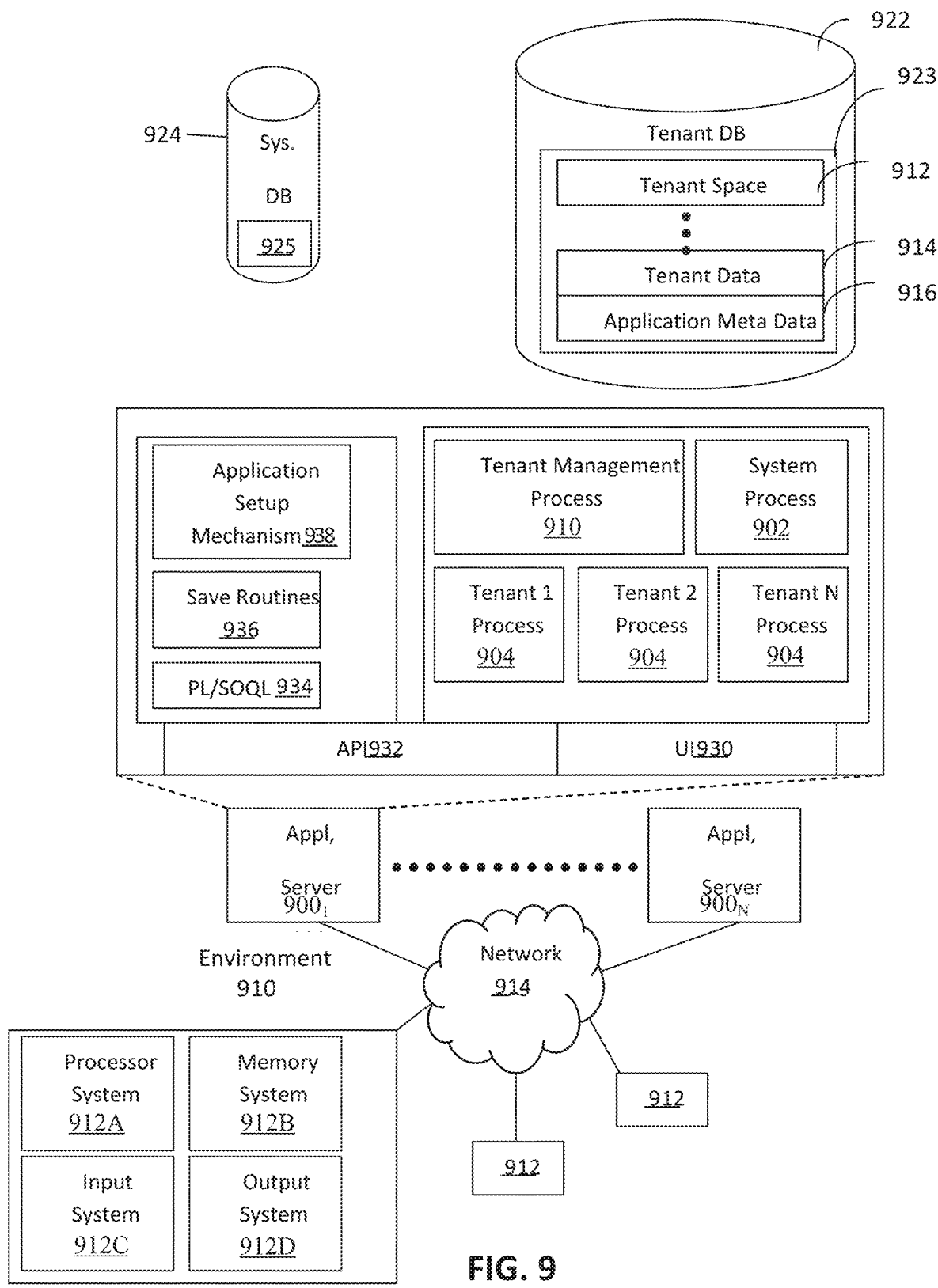
FIG. 9 illustrates a block diagram of an embodiment of elements of FIG. 8 and various possible interconnections between these elements.

According to various embodiments, a customer device with a source I.P. address may belong to an organization within a multi-tenant database system (as discussed with regard to FIGS. 8 & 9). The private link may be deployed to be accessible by each customer device associated with the organization. The customer device may connect to a private link and send a request packet. The request packet may be intended for a target destination, such as—for example—an application or an application server in a private cloud environment or a public cloud environment. For example, the application server to which the request packet is sent may be in a cloud environment that is external to the cloud environment associated with the multi-tenant database system. In other embodiments, the request packet may be sent to a resource within the cloud environment associated with the multi-tenant database system. According to various embodiments, the transit VPC module may be implemented in a public cloud environment to encrypt request packets. According to various embodiments, a private link for a customer device is established when the customer device becomes associated with the organization in the cloud environment associated with the multi-tenant database system.

Figure 4B:
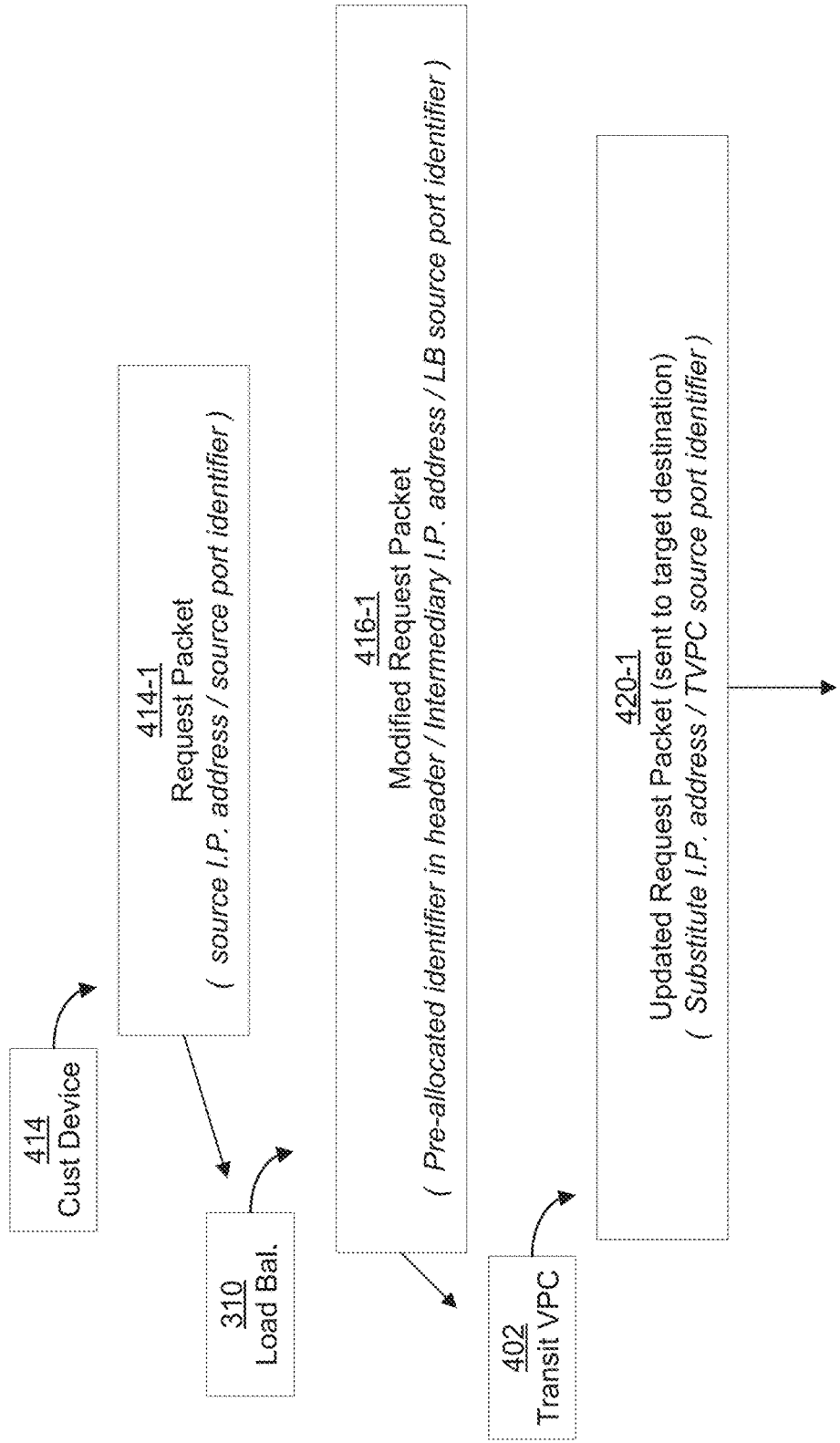
FIG. 4B is a high-level diagram of an environment according to one or more embodiments.

FIG. 4B is a high-level diagram 412 of the Address Manager according to one or more embodiments. A customer device 414 sends a request packet 414-1. The load balancer module 310 replaces the source I.P. address in the request packet 414-1 with an intermediary address and injects a pre-allocated identifier for the source I.P. address in a header of the modified request packet 416-1. The modified request packet 416-1 includes the load balancer's source port identifier. The transit VPC module 402 receives the modified request packet 416-1 and updates the modified request packet 416-1 by replacing the load balancer intermediary I.P. address with a substitute I.P. address previously assigned to the source I.P. address. The transit VPC module 402 stores the load balancer's source port identifier included in the received modified request packet 416-1 and sends the updated request packet 420-1 to a target destination, whereby the updated request packet 420-1 includes a transit VPC source port identifier.

Figure 4C:
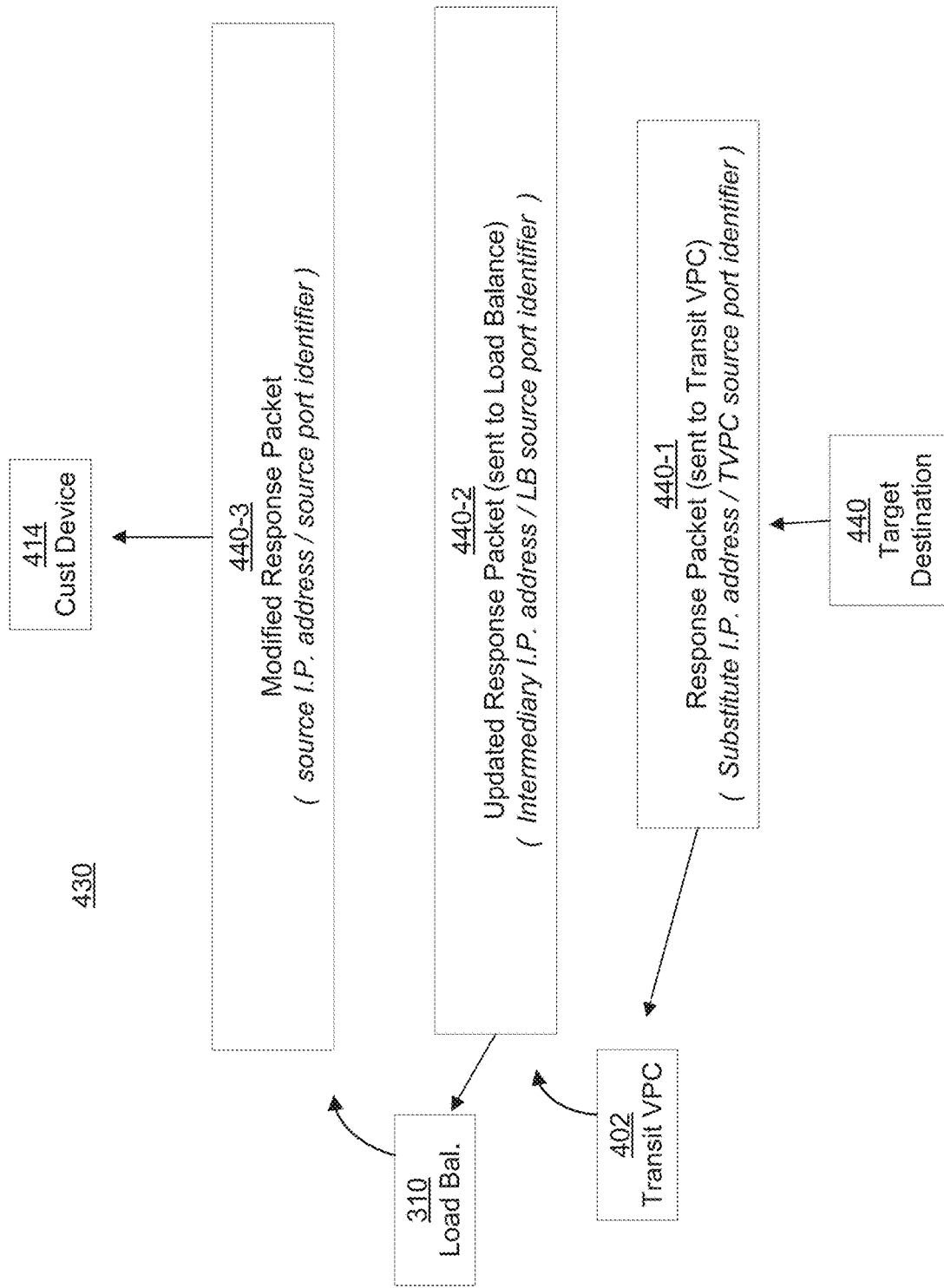
FIG. 4C is a high-level diagram of an environment according to one or more embodiments.

FIG. 4C is a high-level diagram 430 of the Address Manager according to one or more embodiments. A target destination 440 responds to the updated request packet 420-1 sent from the transit VPC module 402. The response packet 440-1 is sent to the substitute address and the transit VPC's source port identifier that was present in the updated request packet 420-1. The transit VPC module 402 receives the response packet 440-1 and replaces the substitute address with the load balancer's intermediary I.P. address. The load balancer's intermediary I.P. address is stored in the transit VPC module 402 in association with the load balancer source port identifier of the previously received modified request packet 416-1. The transit VPC module 402 generates an updated response packet 440-2 with the load balancer's intermediary I.P. address and the load balancer source port identifier of the previously received modified request packet 416-1.

The load balancer module 310 receives the updated response packet 440-2 sent from the transit VPC module 402. The load balancer module 310 generates a modified response packet 440-3 by replacing the intermediary I.P. address with the source I.P. address for the customer device 414. The load balancer module 310 includes the source port identifier from the request packet 414-1 originally sent by the customer device 414. The load balancer module 310 sends the modified response packet 440-3 to the customer device 414 and the customer device 414 ultimately receives the response from the target destination 440.

FIG. 5 is a high-level diagram 500 of the Address Manager according to one or more embodiments. The transit VPC module 402 stores customer data 504, 506 in persistent storage 502. When a pre-allocated identifier and a substitute address is generated for a source address, the transit VPC module 402 stores the pre-allocated identifier and the substitute address in relation to each other in persistent storage 502.

When a request packet (i.e. modified request packet) is received from the load balancer module 310, the load balancer source port identifier included in the request packet (i.e. modified request packet) is further stored in relation to the pre-allocated identifier and the substitute address. For example, a request packet (i.e. modified request packet) will include a pre-allocated identifier in a packet header portion. The transit VPC module 402 may access the stored record for the corresponding source address by matching the pre-allocated identifier in the packet header portion with the pre-allocated identifier in storage 502. The transit VPC module 402 accesses the substitute address in the matching record and utilizes the substitute address to update the packet request. The transit VPC module 402 further stores the load balancer source port identifier in transit VPC storage 502 in the stored record such that the load balancer source port identifier is stored in association with the corresponding pre-allocated identifier and related substitute I.P. address.

Figure 6:
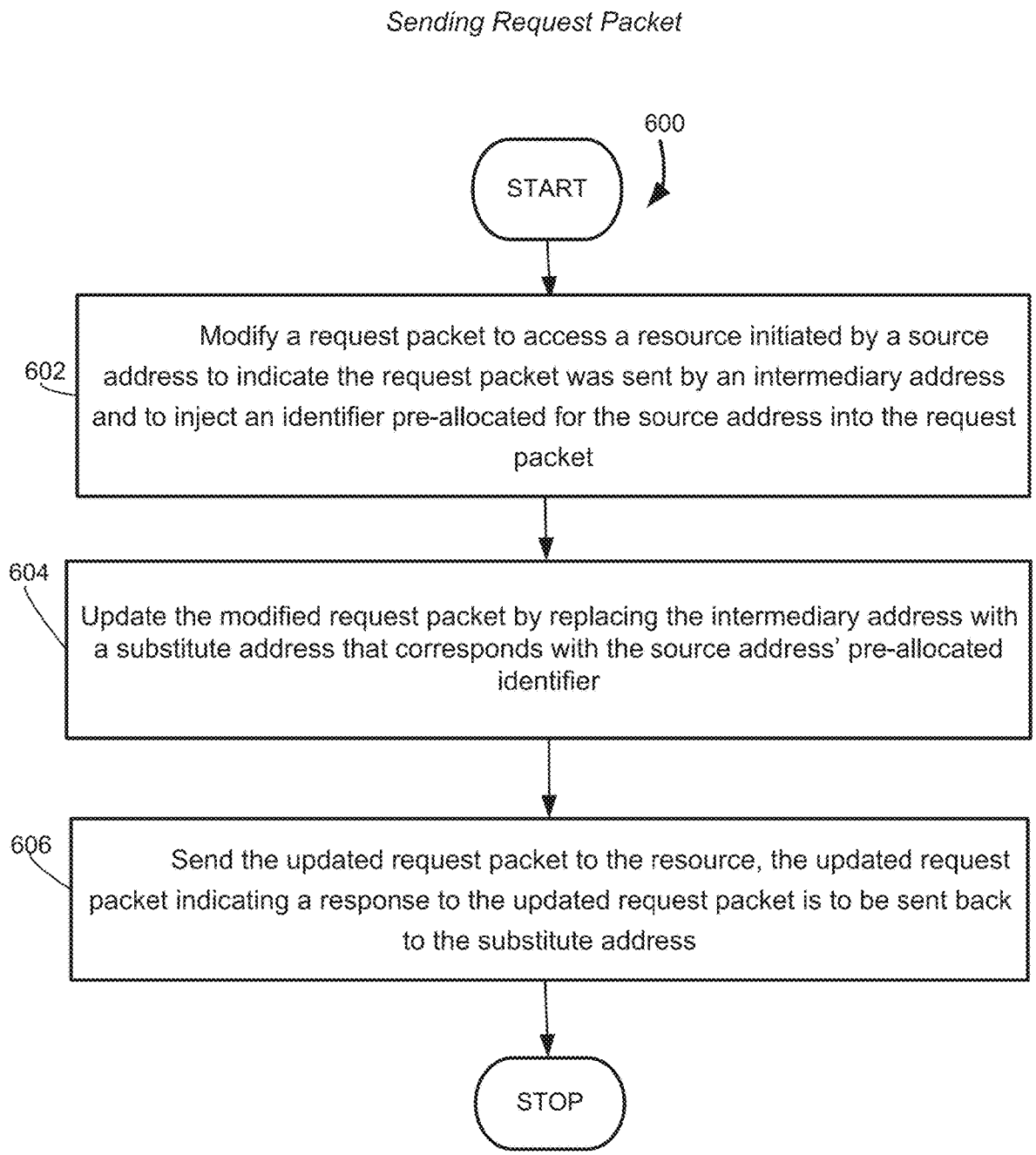
FIG. 6 is an operational flow diagram illustrating a high-level overview of a method for Address Manager, in an embodiment.

As shown in FIG. 6, at step 602 of method 600, the Address Manager modifies a request packet to access a resource initiated by a source address (such as a source I.P. address) to indicate the request packet was sent by an intermediary address (such as an intermediary I.P. address) and injects an identifier pre-allocated for the source address into the request packet. According to various embodiments, the Address Manager pre-allocates the identifier for the source address based on a private connection (such as a private link) established between the source address and a public cloud environment. A transit VPC module of the Address Manager stores the source address' pre-allocated identifier in relation to the source address' substitute address (such as a substitute I.P. address) in persistent storage of the transit VPC module. According to various embodiments, a load balancer module of the Address Manager corresponds to the intermediary address and the load balancer module injects the source address' pre-allocated identifier into a portion of a header of the request packet.

At step 604, the Address Manager updates the modified request packet by replacing the intermediary address with a substitute address that corresponds with the source address' pre-allocated identifier. According to various embodiments, the transit VPC module receives the modified request packet relayed by the load balancer module. The transit VPC module detects the pre-allocated identifier in the header of the modified request packet at the intermediary address. The transit VPC module accesses the persistent storage to retrieve the substitute address that corresponds to the detected pre-allocated identifier. The transit VPC module also detects a load balancer source port identifier associated with the modified request packet and further stores the load balancer source port identifier in relation to the source address' substitute address and pre-allocated identifier.

At step 606, the Address Manager sends the updated request packet to the resource, the updated request packet indicating a response to the updated request packet is to be sent back to the substitute address. According to various embodiments, the Address Manager sends the updated request packet from the transit VPC module via an encrypted tunnel and the updated request packet includes a transit VPC source port identifier. Since the updated request packet includes the substitute address, the resource (such as an external application server) that ultimately receives the updated request packet will be provided with data as to an appropriate destination for a response(s) to the updated request packet. However, the actual identity of the source address will not be revealed to the resource—or during transmission—thereby providing the source address with anonymity and privacy.

Figure 7:
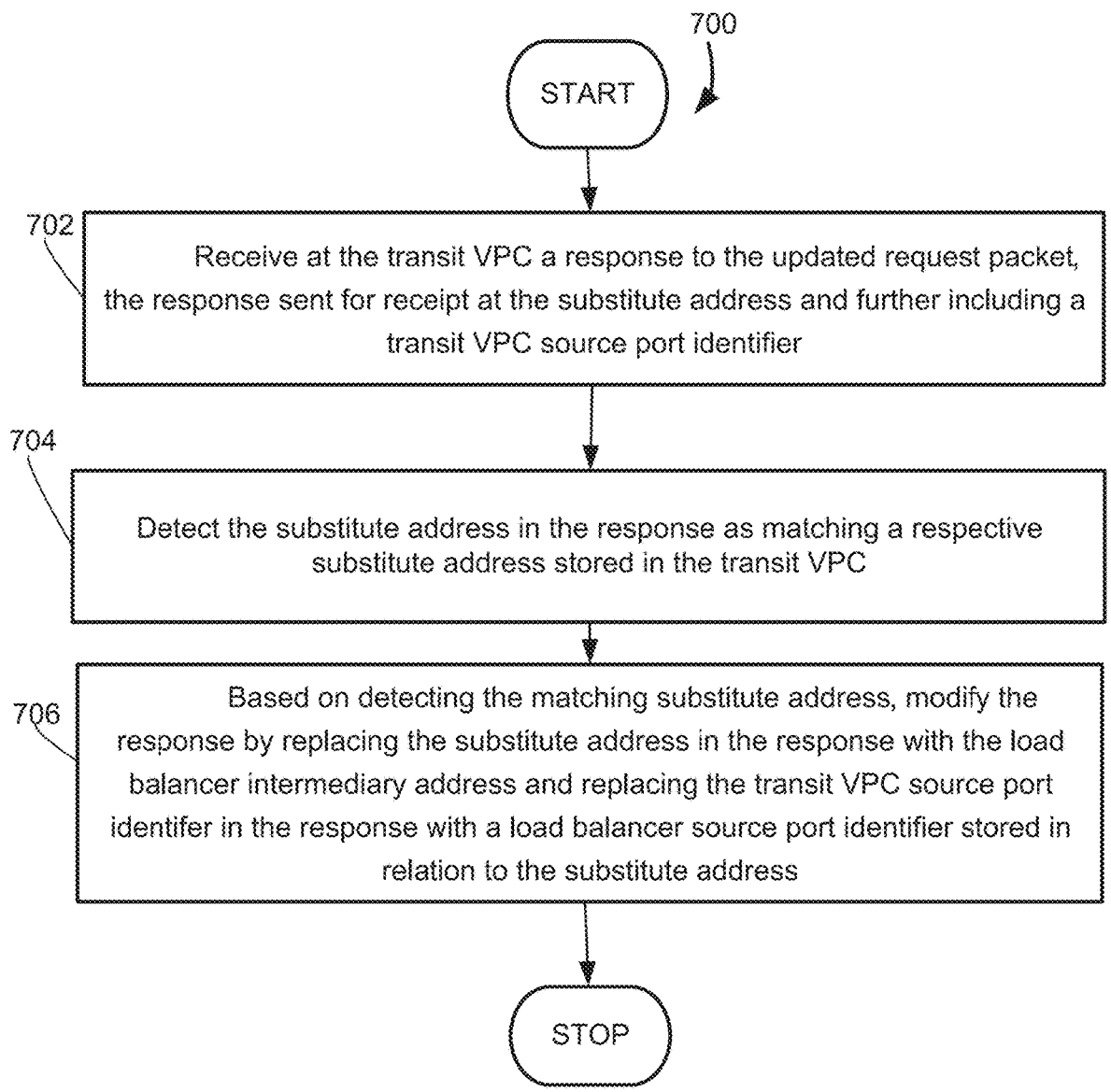
FIG. 7 is an operational flow diagram illustrating a high-level overview of a method for Address Manager, in an embodiment.

According to various embodiments, the resource may send a response(s) in reply based on receipt of the updated request packet that indicates the substitute address and the transit VPC source port identifier. As shown in FIG. 7, at step 702 of method 700, the transit VPC module of the Address Manager receives a response to the updated request packet. The response may be sent for receipt at the substitute address and further includes the transit VPC source port identifier.

At step 704, the transit VPC module detects the substitute address in the response as matching a respective substitute address stored in persistent storage of the transit VPC module. As described above, the transit VPC module stored the load balancer source port identifier included in the modified request packet in relation to the substitute address.

At step 706, based on detecting the matching substitute address, the transit VPC module modifies the response by replacing the substitute address in the response with the load balancer intermediary address. The transit VPC module replaces the transit VPC source port identifier in the response with the load balancer source port identifier that is stored in relation to the matching substitute I.P. address. The transit VPC module forwards the modified response back over to the load balancer module.

It is understood that the reference numerals in FIGS. 3-7 refer to modules, processing, steps and/or data flow that is included in, performed by, managed by, triggered by and/or involves the Address Manager.

System Overview

FIG. 8 illustrates a block diagram of an environment 810 wherein an on-demand database service might be used. The environment 810 may include user system(s) 812, a network 814, a system 816, a processor system 817, an application platform 818, a network interface 820, a tenant data storage 822, a system data storage 824, program code 826, and a process space 828. In other embodiments, the environment 810 may not have all of the components listed and/or may have other elements instead of, or in addition to, those listed above.

The environment 810 is an environment in which an on-demand database service exists. A user system 812 may be any machine or system that is used by a user to access a database user system. For example, any of the user systems 812 may be a handheld computing device, a mobile phone, a laptop computer, a workstation, and/or a network of computing devices. As illustrated in FIG. 8 (and in more detail in FIG. 7) the user systems 812 might interact via the network 814 with an on-demand database service, which is the system 816.

An on-demand database service, such as the system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 816" and the "system 816" will be used interchangeably herein. A database image may include one or more database objects. A relational database management system (RDMS) or the equivalent may execute storage and retrieval of information against the database object(s). The application platform 818 may be a framework that allows the applications of the system 816 to run, such as the hardware and/or software, e.g., the operating system. In an embodiment, the on-demand database service 816 may include the application platform 818 which enables creation, managing and executing one or more applications developed by the provider of the on-demand database service, users accessing the on-demand database service via user systems 812, or third-party application developers accessing the on-demand database service via the user systems 812.

The users of the user systems 812 may differ in their respective capacities, and the capacity of a particular user system 812 might be entirely determined by permissions (permission levels) for the current user. For example, where a salesperson is using a particular user system 812 to interact with the system 816, that user system 812 has the capacities allotted to that salesperson. However, while an administrator is using that user system 812 to interact with the system 816, that user system 812 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 814 is any network or combination of networks of devices that communicate with one another. For example, the network 814 may be any one or any combination of a LAN (local area network), WAN (wide area network), telephone network, wireless network, point-to-point network, star network, token ring network, hub network, or other appropriate configuration. As the most common type of computer network in current use is a TCP/I.P. (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/I.P. is a frequently implemented protocol.

The user systems 812 might communicate with the system 816 using TCP/I.P. and, at a higher network level, use other common Internet protocols to communicate, such as HTTP, FTP, AFS, WAP, etc. In an example where HTTP is used, the user systems 812 might include an HTTP client commonly referred to as a "browser" for sending and receiving HTTP messages to and from an HTTP server at the system 816. Such an HTTP server might be implemented as the sole network interface between the system 816 and the network 814, but other techniques might be used as well or instead. In some implementations, the interface between the system 816 and the network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 816, shown in FIG. 8, implements a web-based customer relationship. management (CRM) system. For example, in one embodiment, the system 816 includes application servers configured to implement and execute CRM software applications as well as provide related data, code, forms, webpages and other information to and from the user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 816 implements applications other than, or in addition to, a CRM application. For example, the system 816 may provide tenant access to multiple hosted (standard and custom) applications, including a CRM application. User (or third-party developer) applications, which may or may not include CRM, may be supported by the application platform 818, which manages creation, storage of the applications into one or more database objects and executing of the applications in a virtual machine in the process space of the system 816.

One arrangement for elements of the system 816 is shown in FIG. 8, including the network interface 820, the application platform 818, the tenant data storage 822 for tenant data 823, the system data storage 824 for system data 825 accessible to the system 816 and possibly multiple tenants, the program code 826 for implementing various functions of the system 816, and the process space 828 for executing MTS system processes and tenant-specific processes, such as running applications as part of an application hosting service. Additional processes that may execute on the system 816 include database indexing processes.

Several elements in the system shown in FIG. 8 include conventional, well-known elements that are explained only briefly here. For example, each of the user systems 812 could include a desktop personal computer, workstation, laptop, PDA, cell phone, or any wireless access protocol (WAP) enabled device or any other computing device capable of interfacing directly or indirectly to the Internet or other network connection. Each of the user systems 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 812 to access, process and view information, pages and applications available to it from the system 816 over the network 814. Each of the user systems 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 816 or other systems or servers. For example, the user interface device may be used to access data and applications hosted by the system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/I.P. based network, any LAN or WAN or the like.

According to one embodiment, each of the user systems 812 and all of its components are operator configurable using applications, such as a browser, including computer code run using a central processing unit such as an Intel Pentium® processor or the like. Similarly, the system 816 (and additional instances of an MTS, where more than one is present) and all of their components might be operator configurable using application(s) including computer code to run using a central processing unit such as the processor system 817, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 818 to intercommunicate and to process webpages, applications and other data and media content as described herein are preferably downloaded and stored on a hard disk, but the entire program code, or portions thereof, may also be stored in any other volatile or nonvolatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/I.P., HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScrI.P.t, ActiveX, any other scripting language, such as VBScrI.P.t, and many other programming languages as are well known may be used. (Java™ is a trademark of Sun Microsystems, Inc.).

According to one embodiment, the system 816 is configured to provide webpages, forms, applications, data and media content to the user (client) systems 812 to support the access by the user systems 812 as tenants of the system 816. As such, the system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

FIG. 9 also illustrates the environment 910. However, in FIG. 9 elements of the system 816 and various interconnections in an embodiment are further illustrated. FIG. 9 shows that the each of the user systems 912 may include a processor system 912A, a memory system 912B, an input system 912C, and an output system 912D. FIG. 9 shows the network 914 and also shows that the system 816 may include the tenant data storage 922, the tenant data 923, the system data storage 924, the system data 925, a User Interface (UI) 930, an Application Program Interface (API) 932, a PL/SOQL 934, save routines 936, an application setup mechanism 938, applications servers $900_1$-$900_N$, a system process space 902, tenant process spaces 904, a tenant management process space 910, a tenant storage area 912, a user storage (or tenant data) 914, and application metadata 916. In other embodiments, the environment 910 may not have the same elements as those listed above and/or may have other elements instead of, or in addition to, those listed above.

The user systems 812, the network 814, the system 816, the tenant data storage 822, and the system data storage 824 were discussed above in FIG. 8. Regarding the user systems 912, the processor system 912A may be any combination of one or more processors. The memory system 912B may be any combination of one or more memory devices, short term, and/or long-term memory. The input system 912C may be any combination of input devices, such as one or more keyboards, mice, trackballs, scanners, cameras, and/or interfaces to networks. The output system 912D may be any combination of output devices, such as one or more monitors, printers, and/or interfaces to networks. As shown by FIG. 8, the system 816 may include the network interface 820 implemented as a set of HTTP application servers 900, the application platform 818, the tenant data storage 822, and the system data storage 824. Also shown is the system process space 902, including individual tenant process spaces 904 and the tenant management process space 910. Each application server 900 may be configured to access tenant data storage 822 and the tenant data 923 therein, and the system data storage 824 and the system data 925 therein to serve requests of the user systems 812. The tenant data 923 might be divided into individual tenant storage areas 912, which may be either a physical arrangement and/or a logical arrangement of data. Within each tenant storage area 912, the user storage 914 and the application metadata 916 might be similarly allocated for each user. For example, a copy of a user's most recently used (MRU) items might be stored to the user storage 914. Similarly, a copy of MRU items for an entire organization that is a tenant might be stored to the tenant storage area 912. The UI 930 provides a user interface and the API 932 provides an application programmer interface to the system 816 resident processes to users and/or developers at the user systems 812. The tenant data and the system data may be stored in various databases, such as one or more Oracle™ databases.

The application platform 818 includes the application setup mechanism 938 that supports application developers' creation and management of applications, which may be saved as metadata into the tenant data storage 822 by the save routines 936 for execution by subscribers as one or more tenant process spaces 904 managed by the tenant management process 910 for example. Invocations to such applications may be coded using the PL/SOQL 934 that provides a programming language style interface extension to the API 932. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 916 for the subscriber making the invocation and executing the metadata as an application in a virtual machine.

Each application server 900 may be communicably coupled to database systems, e.g., having access to the system data 925 and the tenant data 923, via a different network connection. For example, one application server $900_1$ might be coupled via the network 914 (e.g., the Internet), another application server $900_{N-1}$ might be coupled via a direct network link, and another application server $900_N$ might be coupled by yet a different network connection. Transfer Control Protocol and Internet Protocol (TCP/I.P.) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-I.P. load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also may be used. For example, in certain embodiments, three consecutive requests from the same user could hit three different application servers 900, and three requests from different users could hit the same application server 900. In this manner, the system 816 is multi-tenant, wherein the system 816 handles storage of, and access to, different objects, data and applications across disparate users and organizations.

As an example of storage, one tenant might be a company that employs a sales force where each salesperson uses the system 816 to manage their sales process. Thus, a user might maintain contact data, leads data, customer follow-up data, performance data, goals and progress data, etc., all applicable to that user's personal sales process (e.g., in the tenant data storage 822). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 816 might also maintain system level data usable by multiple tenants or other data. Such system level data might include industry reports, news, postings, and the like that are sharable among tenants.

In certain embodiments, the user systems 812 (which may be client systems) communicate with the application servers 900 to request and update system-level and tenant-level data from the system 816 that may require sending one or more queries to the tenant data storage 822 and/or the system data storage 824. The system 816 (e.g., an application server 900 in the system 816) automatically generates one or more SQL statements (e.g., one or more SQL queries) that are designed to access the desired information. The system data storage 824 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
    modifying, by a database system, a request packet to access a resource initiated by a source node having a source address to indicate the request packet was sent from an intermediary address and to inject an identifier pre-allocated for the source address into the request packet;
    updating, by the database system, the modified request packet by replacing the intermediary address with a substitute address that corresponds with the source address' pre-allocated identifier; and
    sending, by the database system, the updated request packet to the resource, the updated request packet indicating a response to the updated request packet is to be sent back to the substitute address.

2. The method of claim 1, further comprising:
    pre-allocating, by the database system, the identifier based on a private connection established between the source address and a public cloud environment;
    storing, by the database system, the substitute address for the source address; and
    storing, by the database system, the source address' pre-allocated identifier in relation to the source address' substitute address.

3. The method of claim 2, wherein the private connection is established by set up of a private link for the source address and wherein the source address' pre-allocated identifier and substitute address are stored in relation to each other in persistent storage of a transit virtual private connection (transit VPC) situated in the public cloud environment.

4. The method of claim 3, wherein the transit VPC is further situated between the private link and the resource, the resource being accessible in the public cloud environment.

5. The method of claim 4, further comprising:
    modifying, by the database system, the request packet at a load balancer that corresponds to the intermediary address, the load balancer injecting the source address' pre-allocated identifier into a portion of a header of the request packet.

6. The method of claim 3, further comprising:
detecting by the transit VPC the pre-allocated identifier injected into a portion of a header of the request packet at the intermediary address;
accessing the persistent storage to retrieve the substitute address that corresponds to the injected pre-allocated identifier; and
storing, in the persistent storage, a load balancer source port identifier of the modified request packet in association with the substitute I.P. address and the corresponding injected pre-allocated identifier.

7. The method of claim 6, further comprising:
receiving at the transit VPC a response to the updated request packet, the response sent for receipt at the substitute address and further including a transit VPC source port identifier of the updated request packet;
detecting the substitute I.P. address in the response as matching a substitute I.P. address stored in the transit VPC; and
based on detecting the matching substitute I.P. address, modifying the response by replacing the substitute address in the response with the intermediary address of the load balancer and replacing the transit VPC source port identifier in the response with a load balancer source port identifier stored in relation to the substitute I.P. address.

8. A computer program product comprising computer-readable program code to be executed by one or more processors when retrieved from a non-transitory computer-readable medium, the program code including instructions for:
modifying, by a database system, a request packet to access a resource initiated by a source node having a source address to indicate the request packet was sent from an intermediary address and to inject an identifier pre-allocated for the source address into the request packet;
updating the modified request packet by replacing the intermediary address with a substitute address that corresponds with the source address' pre-allocated identifier; and
sending the updated request packet to the resource, the updated request packet indicating a response to the updated request packet is to be sent back to the substitute address.

9. The computer program product of claim 8, wherein the program code includes further instructions to:
pre-allocating the identifier based on a private connection established between the source address and a public cloud environment;
storing the substitute address for the source address; and
storing the source address' pre-allocated identifier in relation to the source address' substitute address.

10. The computer program product of claim 9, wherein the private connection is established by set up of a private link for the source address and wherein the source address' pre-allocated identifier and substitute address are stored in relation to each other in persistent storage of a transit virtual private connection (transit VPC) situated in the public cloud environment.

11. The computer program product of claim 10, wherein the transit VPC is further situated between the private link and the resource, the resource being accessible in the public cloud environment.

12. The computer program product of claim 11, wherein the program code includes further instructions to:
modify the request packet at a load balancer that corresponds to the intermediary address, the load balancer injecting the source address' pre-allocated identifier into a portion of a header of the request packet.

13. The computer program product of claim 10, wherein the program code includes further instructions to:
detect by the transit VPC the pre-allocated identifier injected into a portion of a header of the request packet at the intermediary address;
access the persistent storage to retrieve the substitute address that corresponds to the injected pre-allocated identifier; and
store, in the persistent storage, a load balancer source port identifier of the modified request packet in association with the substitute I.P. address and the corresponding injected pre-allocated identifier.

14. The computer program product of claim 13, wherein the program code includes further instructions to:
receive at the transit VPC a response to the updated request packet, the response sent for receipt at the substitute address and further including a transit VPC source port identifier of the updated request packet;
detect the substitute I.P. address in the response as matching a substitute I.P. address stored in the transit VPC; and
based on detecting the matching substitute I.P. address, modify the response by replacing the substitute address in the response with the intermediary address of the load balancer and replacing the transit VPC source port identifier in the response with a load balancer source port identifier stored in relation to the substitute I.P. address.

15. A system comprising:
one or more processors; and
a non-transitory computer readable medium storing a plurality of instructions, which when executed, cause the one or more processors to:
modify a request packet to access a resource initiated by a source node having a source address to indicate the request packet was sent from an intermediary address and to inject an identifier pre-allocated for the source address into the request packet;
update the modified request packet by replacing the intermediary address with a substitute address that corresponds with the source address' pre-allocated identifier; and
send the updated request packet to the resource, the updated request packet indicating a response to the updated request packet is to be sent back to the substitute address.

16. The system of claim 15, wherein the plurality of instructions, when executed, further cause the one or more processors to:
pre-allocate the identifier based on a private connection established between the source address and a public cloud environment;
store the substitute address for the source address; and
store the source address' pre-allocated identifier in relation to the source address' substitute address.

17. The system of claim 16, wherein the private connection is established by set up of a private link for the source address and wherein the source address' pre-allocated identifier and substitute address are stored in relation to each other in persistent storage of a transit virtual private connection (transit VPC) situated in the public cloud environment.

18. The system of claim 17, wherein the transit VPC is further situated between the private link and the resource, the resource being accessible in the public cloud environment.

19. The system of claim 18, wherein the plurality of instructions, when executed, further cause the one or more processors to:

modify the request packet at a load balancer that corresponds to the intermediary address, the load balancer injecting the source address' pre-allocated identifier into a portion of a header of the request packet.

20. The system of claim 17, wherein the plurality of instructions, when executed, further cause the one or more processors to:

detect by the transit VPC the pre-allocated identifier injected into a portion of a header of the request packet at the intermediary address;

access the persistent storage to retrieve the substitute address that corresponds to the injected pre-allocated identifier;

store, in the persistent storage, a load balancer source port identifier of the modified request packet in association with the substitute I.P. address and the corresponding injected pre-allocated identifier;

receive at the transit VPC a response to the updated request packet, the response sent for receipt at the substitute address and further including a transit VPC source port identifier of the updated request packet;

detect the substitute I.P. address in the response as matching a substitute I.P. address stored in the transit VPC; and based on detecting the matching substitute I.P. address, modify the response by replacing the substitute address in the response with the intermediary address of the load balancer and replacing the transit VPC source port identifier in the response with a load balancer source port identifier stored in relation to the substitute I.P. address.

* * * * *